Figure 1:
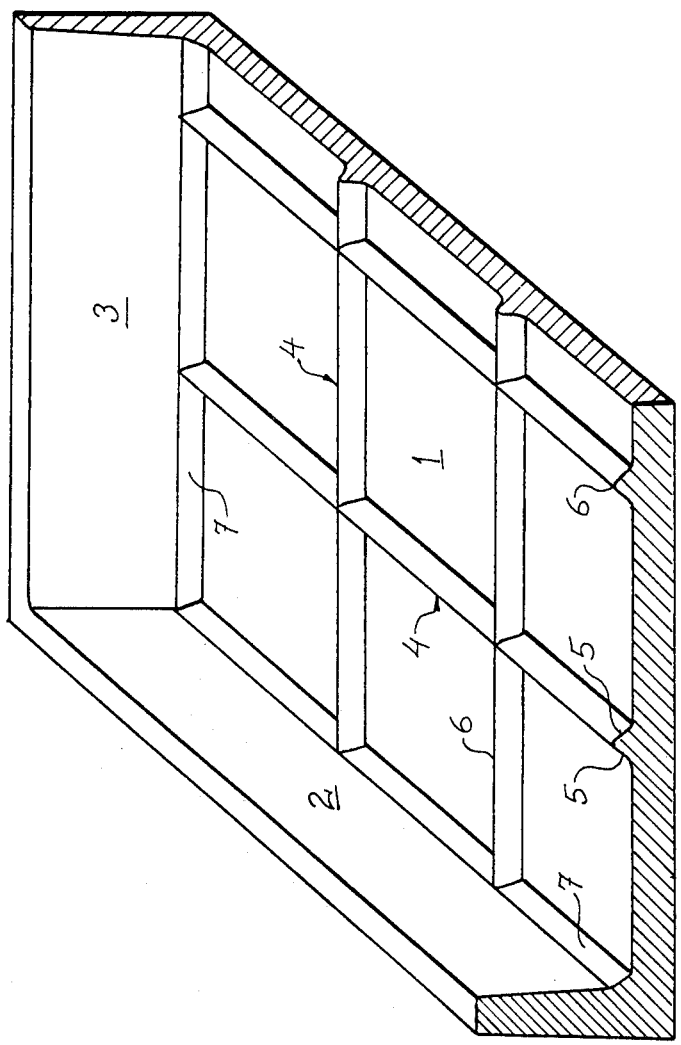
Figure 2:
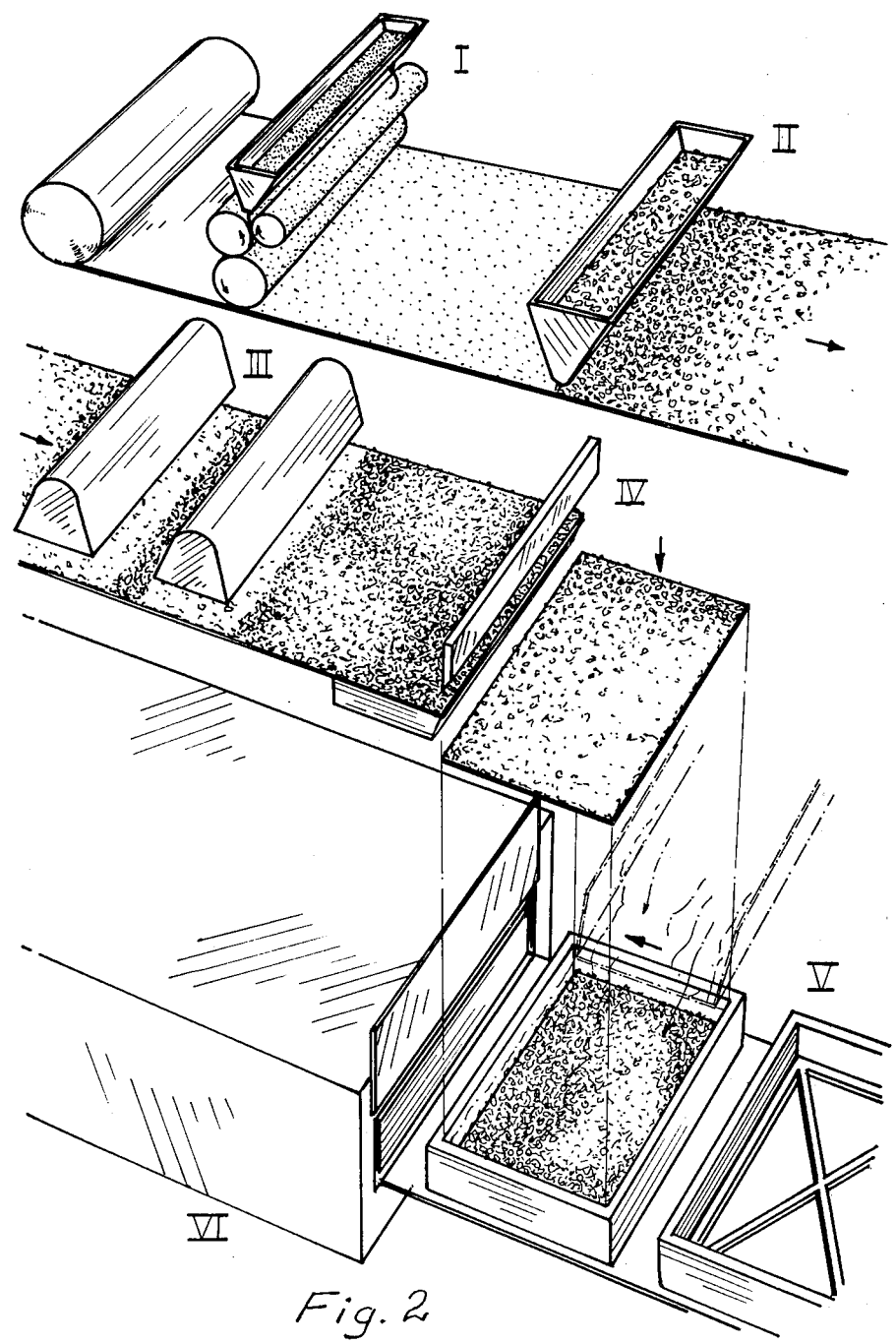

United States Patent [19]

Engström et al.

[11] 4,261,938

[45] Apr. 14, 1981

[54] METHOD OF PRODUCING GLAZED CERAMIC BUILDING MATERIALS

[75] Inventors: Carl B. A. Engström, Uttran; Gösta A. Persson, Bromölla, both of Sweden

[73] Assignee: Euroc Development AB, Arlov, Sweden

[21] Appl. No.: 720,719

[22] Filed: Sep. 7, 1976

Related U.S. Application Data

[63] Continuation-in-part of Ser. No. 556,369, Mar. 7, 1975, pat. no. 1,946

[30] Foreign Application Priority Data

Mar. 12, 1974 [SE] Sweden .................................. 7403276
Dec. 27, 1974 [SE] Sweden .................................. 7416302

[51] Int. Cl.³ ............................................. C04B 35/14
[52] U.S. Cl. .................................. 264/43; 106/40 V; 264/60; 264/122; 264/221
[58] Field of Search ..................... 264/43, 60, 221, 122; 106/40 V

[56] References Cited

U.S. PATENT DOCUMENTS 2,310,432  2/1943  Haux ........................................ 264/60
3,903,343  9/1975  Pfaff ....................................... 264/122

*Primary Examiner*—John Parrish
*Attorney, Agent, or Firm*—Fred Philpitt

[57] ABSTRACT

A method of producing decorative cellular ceramic building materials in a single firing process from $SiO_2$-containing starting materials is disclosed according to which method at least the bottom of a refractory mold is covered with a first layer of a glass material or a glass forming composition which does not expand when heated and which has a melting point of 800°–1200° C., whereafter the $SiO_2$-containing starting material used for producing the cellular ceramic is applied in the form of a second layer on the first layer in the mold, whereafter the mold and its contents are heated to 800°–1000° C. for a period of time of such duration that the ceramic starting material and the glass material sinter together and the ceramic starting material obtains a porous structure.

13 Claims, 2 Drawing Figures

METHOD OF PRODUCING GLAZED CERAMIC BUILDING MATERIALS

This is a continuation-in-part of our application Ser. No. 556,369, filed Mar. 7, 1975, now abandoned.

The present invention relates to a method of producing ceramic building materials in the form of bricks, blocks, rods, slabs, wall elements, floor elements, roof elements or the like, comprising a hard and porous core of so-called cellular ceramic, primarily foam ceramic, at least one side of which material is covered with a continuous, preferably coloured or patterned glaze of a weather-resistant glass material.

By "cellular ceramic" as used here is meant any type of cellular ceramic material irrespective of its method of manufacture, while by "foam ceramic" is meant such porous solidified ceramic materials as are produced by heating to sintering and expansion (blowing) of material mixtures having a high $SiO_2$-content and containing an expansion or blowing agent of the type which develops a gas when heated to temperatures in the vicinity of the sintering and softening temperature of the $SiO_2$-containing material. Material of this type is also designated "foam glass" or "cellular glass".

Cellular ceramic materials and foam ceramic materials may be produced in the form of balls or small pieces for use as a light-ballast material in concrete constructions, and as ready-formed building elements of different types and size from smaller building blocks up to large module elements. In recent times, foam ceramic materials have been produced of such high mechanical strength (higher than the mechanical strength of, for example, light concrete having the same weight by volume) that they can be readily used in supporting structures.

The present invention relates to a method of producing cellular ceramics, primarily foam ceramics, in relatively large pieces, at least one side of said pieces being covered with a dense, preferably colored or patterned glaze of a weather-resistant glass material.

A more detailed description of the manufacture of pure foam ceramics is given, inter alia, in our U.S. Pat. No. 3,942,990, the specification of which is a part of the present specification.

Prior to filling the corresponding patent application it was known that one serious disadvantage with known methods of manufacturing foamed ceramics is that the end products are relatively expensive, and consequently the possibility of being able to use very inexpensive waste materials rich in silica as components in the starting composition is highly desirable. Examples of the materials envisaged include fly ash obtained from waste-heat boilers, dust obtained from electrometallurgical furnaces and dust obtained when crushing macadam. Experiments made with such waste products have shown that they cannot be used for the purpose envisaged when applying techniques at present known to the art. The reason for this is that the products contain impurities which oxidize at relatively low temperatures and which, when heated to produce the porous structure desired, give rise to an uncontrollable pore formation and/or an undesirable low-viscous melt. Uncontrollable pore formation can occur if the starting composition contains carbon or carbon-containing substances, while undesirable (premature) melting occurs if said starting substance contains oxides in a low valency stadium, e.g. FeO. Such oxides have the ability to form relatively low melting eutectic compositions, so that melting may take place prematurely, at a point undesirable with respect to the formation of pores.

A combination of these effects can also occur, insomuch as carbon or carbon-containing substances reduce oxides, e.g. $Fe_2O_3$ to a lower valency state when heating to the temperature at which the foamed ceramic is formed.

On the basis of the aforegoing it was found that the inexpensive waste products envisaged could be used for producing foamed ceramics in a safe and reproducible manner, if the starting composition was admixed with an oxidizing agent capable of reacting with the oxidizable substances in said starting material and of later reacting the material free of impurites with the added difficultly oxidized pore-forming agent, to form the porous structure determinative of the properties of the finished product.

The invention of the U.S. patent is mainly characterized by using as a starting material for producing foamed ceramics a composition containing (1) at least one waste product rich in silica and containing readily oxidizable substances which, when heated, are themselves capable of producing uncontrollable pore formation and/or an undesirable melt, and (2) a strongly oxidizing agent, the quantity of oxidizing agent being such that the oxidizable substances are oxidized to eliminate or to reduce the uncontrollable pore formation and/or the melting and wherein the desired port structure is obtained by oxidation of the difficultly oxidizable carbon-containing pore-forming agent.

The difficultly oxidizable pore-forming agent envisaged is primarily a carbon-containing agent.

One common feature of the starting materials used in accordance with the present invention, and having the character of waste material, is that they shall have a relatively high silica content and be very finely divided. The aforementioned waste materials, i.e. dust removed from waste gases emanating from electrometallurgical processes and dust trapped in stone crushing plants, for example in conjunction with the manufacture of macadam, possess the aforementioned combination of properties.

The starting composition can be admixed with other products for the purpose of correcting the ceramic analysis. Examples of such products are natural minerals, e.g. feldspar, glacial clay, quartz, diabase, nepheline syenite, kaolin, or mixtures thereof, for example sand.

The starting composition may contain between approximately 25% and approximately 80% waste product rich in silica, calculated on the weight of the starting mixture.

Dust trapped when crushing stones comprises natural minerals, such as feldspar, quartz, diabase etc. Such dusts usually have a specific surface which is smaller than that of dust obtained from metallurgical processes, e.g. 300–400 $m^2/kg$ as opposed to $>1000$ $m^2/kg$. If dust obtained from stone crushing operations is used alone, it is preferably ground further to a specific surface of approximately 800 $m^2/kg$, in order to provide for a sufficiently high reaction rate when sintering.

This extra grinding step can be avoided when the crushed-stone dust is mixed with flue dust.

In order for an acceptable foamed ceramic to be obtained when sintering in accordance with the present invention, the starting materials shall have the following chemical composition. With regard to each specific raw material used, however, a test must be made for the purpose of determining in each particular case the suitable analyses.

60–75% $SiO_2$ (glass former)
5–13% $Al_2O_3 + Fe_2O_3$ (glass stabilizer)
approximately 2% CaO (glass stabilizer)
0–6% MgO (glass stabilizer)
10–15% $Na_2O + K_2O$ (fluxing agent)

The reaction rate can be increased in the melting process by using alkalihydroxide as the fluxing agent. More specifically, at least 80% of the fluxing agent should be alkali-hydroxide. Such a hydroxide is very active, since it dissolves to a concentrated aqueous solution and is able to retain its activity when heated. The alkalihydroxide is very reactive at those temperatures envisaged for forming the foamed ceramic according to the present invention. Further, alkalihydroxide forms eutectic melts with other components, primarily with silica and $Al_2O_3$. The quantity of "active alkali" should be carefully adjusted in relation to the other components of the composition, since excessive quantity of total alkali can result in an impaired resistance of the product to water, while an insufficient quantity prevents a sufficient quantity of molten phase from being formed at the desired low temperature, at which products having a relatively high volumetric weight are obtained.

The oxidizing agent normally used is an inorganic agent. Examples of oxidizing agents include manganese dioxide (pyrolusite) nitrates, permanganates etc. As previously mentioned, the oxidizing agent is operative in combusting all organic compounds, and also sulphur at a relatively low temperature, in combination with air, at which sintering has not yet started to take place, and to oxidize all divalent iron oxides to trivalent iron oxides and/or prevent the higher oxides such as $Fe_2O_3$ and $SO_3$, for example, from being reduced.

Since all free carbon, which normally serves as a pore-forming agent in foam glass processes, is oxidized away, additional pore-forming agents must be added. Silicon carbide, which is a carbon-containing pore-forming agent, has been found suitable in this connection. The silicon carbides will not react with the oxidizing agent until the composition is in molten form, whereafter they form the desired pore structure.

The following procedure can be applied when producing foamed ceramics: a finely divided waste dust rich in silica and optionally admixed with natural mineral (together approximately 80% of the dry weight of the composition) may be mixed, e.g. by wet grinding in a ball mill, with an approximately 10–15% aqueous solution of alkalihydroxide, 3–4% hydraulic or latent hydraulic binding agent, e.g. Portland cement binders or blast furnace slag, 1–3% of a strongly oxidizing agent, e.g. manganese dioxide, and 0.1–0.5% pore-forming agent, e.g. silicon carbide, whereafter the thus obtained slurry may be dewatered to produce thin-walled, porous nodules or a fine-grained product. The product is then heated very rapidly to approximately 800°–900° C. in special molds, at which temperature a melt is formed. The reaction between the pore-forming agent and the remaining surplus of oxidizing agent causes a gaseous product to be formed, which forms pores in the melt. The expanded product obtains a very uniform pore structure. The product is then rapidly cooled to approximately 600° C., whereafter it is allowed to cool slowly in a cooling furnace.

The present invention is based on a known method of producing foamed ceramic bodies by (a) introducing into an open refractory mold a $SiO_2$-containing composition that is known to have the ability of foaming and expanding in volume when heated to 800°–1000° C., (b) heating said refractory mold and composition under strongly oxidizing conditions to a temperature within the range of 800°–1000° C. for a time sufficient to cause the $SiO_2$-containing composition to foam and expand in volume, (c) cooling the foamed ceramic body, and (d) removing the foamed ceramic body from the refractory mold.

The improvement of the present method comprises, prior to step (a) above, depositing on the bottom of the refractory mold a layer consisting of particles of crushed glass material, said crushed glass material having a melting point of 800°–1200° C. and said layer of crushed glass material being incapable of foaming on heating at a temperature of 800°–1200° C., said mold containing a member selected from the group consisting of carbon and carbon-containing materials, said latter materials being capable of forming carbon upon heating to said temperatures whereby, in proceeding according to steps (a) and (b) the lower layer in the mold, consisting of crushed glass, will sinter together to form a dense lower surface layer and this dense lower surface layer will also be closely united with the overlying layer of the foamed $SiO_2$-containing composition, said oxidizing conditions being sufficient to oxidize said carbon thereby to prevent formation of non-glossy spots on the glaze surface.

Subsequent to being cooled, the ready-glazed foam ceramic can be removed from the mold. To facilitate removal of the foam ceramic from the mold, the inner surface of the mold should be coated with a suitable release agent, such as kaolin, alumina oxide ($Al_2O_3$) or some other material which is not readily melted. Prior to being used, the inside of the mold may be coated, for example, with an aqueous suspension of the release agent, optionally mixed with an inorganic or organic binding agent. The water content of the suspension is evaporated prior to firing the foam ceramic and the organic binding agent is optionally burned-off during the actual firing process. One of the advantages afforded by the use of a release agent suspension which contains a binding agent is that it can also be used to bond the glass material in the mold during the handling of said mold prior to the actual foam ceramic firing operation. Since the glass layer is only intended to form a decorative surface layer, the thickness of said layer should not exceed 3–5 mm and a glaze layer of 1–2 mm or therebelow is usually sufficient. Since the glass material can be fixed in the mold by means of the binding agent, it is possible to produce glazes of any pattern and color comprising larger or smaller mutually oriented pieces of glass, while the interspaces therebetween is filled with a more finely-divided glass material or glass-forming material.

Usually, the particles used for the glaze layer should each have a size exceeding 1 mm. The upper size is not very critical. Excellent results have been attained with materials containing particles with an upper size in the range 10–20 mm. It is important that no dust particles are present. In order to secure that no such particles are present the particles used for the glaze layer may be washed with an aqueous solution of a detergent.

From conventional glazing techniques it is known that a granular material should comprise different particles fractions (particle sizes) so as to provide a dense glaze. This also applies in respect of the method according to the invention.

Glazed foam ceramics provided with relief patterns can be produced in molds whose bottoms are provided with a three-dimensional pattern forming ridges and valleys.

Glazed foam ceramic elements of limited size, for example, small building bricks, are conveniently produced by sawing up larger foam ceramic blocks. Even foam ceramics having a relatively high degree of mechanical strength can be readily sawn by hand using a hand saw with hardmetal teeth, or by corresponding machine equipment.

If, subsequent to firing, it is intended to divide a large, glazed foam ceramic block into smaller blocks, the mold is suitably prepared for said division of the block in conjunction with preparing the mold for use. The manufactured foam ceramic block can be provided with suitable saw lines by providing the bottom of the mold with a relief pattern of ridges arranged according to the desired division of the block. Conveniently, the glass material, and thus also the produced glaze, may be permitted to cover the flanks of the ridges, but not the crowns thereof. In this way it is possible to produce glazed foam ceramic blocks provided with unglazed saw lines, which considerably facilitates a division of the block into smaller pieces whilst at the same time the glaze in each of said smaller blocks obtains uniform edges.

The method according to the invention is disclosed more precisely in the accompanying claims, while the method of providing the obtained product with unglazed saw lines is illustrated in the accompanying drawings.

SHORT DESCRIPTION OF THE DRAWINGS

The drawing shows part of a mold made of refractory material and intended for the manufacture of glazed foam ceramics and provided with a relief pattern at the bottom of the mold, said relief pattern being of the type which can be used for the manufacture of glazed foam ceramic blocks provided with unglazed score or saw lines imprinted in the foam ceramic and intended as partition lines when sawing the molded block into smaller blocks. In the drawing there is shown a refractory mold bottom 1, two side surfaces 2, 3 and a number or ridges 4 extending along the bottom 1, said ridges having sloping flank surfaces which, at the top of the ridges, converge to a point when seen in cross-section, said ridges intersecting so as to form a pattern corresponding to the desired manner of dividing the blocks into smaller pieces. The ridges need not form part of the mold bottom, but may also have the form of elements placed loosely in the mold.

When preparing the mold for use, the inner surfaces of the mold are firstly coated with a suitable release agent, whereafter a thin and uniform layer of glass material is supplied to the mold, it being ensured that said layer of glass material also covers the flanks 5 of the ridges 4 and corresponding flanks 7 which extend towards the side edges 2 and 3 of the mold, but not the crowns 6 of the ridges 4. The glass material is, at the same time, conveniently fixed in the mold in the manner previously described, with the aid of a binding agent. The foam ceramic starting material is then supplied to the mold and the mold is ready for the firing operation. Subsequent to firing the mold and after the glzazed foam ceramic has cooled and has been removed from the mold, said ceramic can be surface-treated, for example polished or engraved. Generally, it is sufficient to cleanse the ceramic to remove any remaining release agent which may have adhered to the outer surface of the glaze.

In accordance with a further development of the method according to the invention, the layer of glass material or glass-forming composition which does not expand when heated and which has a melting point of 800°–1200° C. comprises a granular material or composition and the particles or granules are conveniently bonded to each other after or, preferably, prior to being supplied to the mold.

It has been found that the particles incorporated in the first layer should be bonded to each other when the expanding material is supplied to the mold. If the particles are not bonded together, the expanding material is liable to move into the interspaces between the particles of the first layer, giving rise to problems when heating the mold. Penetration of the expanding material into said interspaces may be caused by the weight of the expanding material and by movement thereof in the mold. Since the molds are relatively expensive and the provision of such molds represents an economic load it is convenient to bond the particles of the first layer to form a cake of said particles prior to their introduction into the mold. The cake forming the first layer may be produced by placing on a plastics foil a mixture of the non-expanding glass material or the glass-forming composition and a binding agent in the form of a layer whereafter the layer is permitted to solidify. The plastics foil can then be removed prior to introducing the cake into the mold or may accompany the cake into said mold, said plastics foil in this latter case being destroyed during the firing operation. If the sides of the building materials formed at the walls of the mold are to be patterned or provided with reliefs, the surface of the mold shall be designed in a corresponding manner. It has been found that a cake according to the invention can well adapt to the pattern surface, so that the material surface of the produced building material obtains a particularly high-class glazed surface.

According to one embodiment of the invention, the particles of glass material or glass-forming composition are conveniently placed on a thin substrate and bonded together by means of an organic binding agent. Any suitable binding agent may be used, such as acrylate glue and the like.

In accordance with another embodiment of the invention the thin substrate may be removed subsequent to the particles having been bonded together, whereafter said bonded particles are introduced into the refractory mold.

In accordance with yet another embodiment of the invention, the thin substrate may also comprise a material which is destroyed when heating the mold together with its contents to temperatures between 800°–1000° C., a packet being formed by the substrate and the particles bonded together thereon by means of the binding agent externally of the mold, said packet subsequent hereto being introduced into said mold.

According to an extremely suitable embodiment of the invention, the particles of said material which does not expand when heated may comprise crushed glass frit. The glass material may conveniently comprise an ordinary uncolored glass and coloring agents may be supplied to the layer either by being mixed with said crushed glass or by admixing a further crushed colored material, for example glass material.

A practical way of carrying out the method according to the invention will now be described with reference to the enclosed drawing. The method comprises passing a web, for example, polyethylene foil past a first station (Station I), at which station the web is provided with a coating of adhesive. At a second station (Station II) the web is provided with a layer of crushed glass, the glass particles being bonded together on said web. The foil web with the layer of crushed glass located thereon is then passed through a heating zone, at which there may be arranged a number of infrared lamps directed to irradiate the adhesive layer so as to harden the same (Station III). Subsequent to hardening the adhesive layer, the now solidified coherent web is passed through a cutting station (Station IV), where said web is cut into pieces suitable for introduction into the molds. These pieces are then placed in molds treated with a release agent (Station V). The expandable material is then placed on top of the first layer in the molds, whereafter said molds are introduced into furnaces for heating and expansion (Station VI). Subsequent to firing the molds there is obtained in a building material in block form having a high-grade glazed surface.

The invention will now be further illustrated with examples.

EXAMPLE 1

A mixture of the following ingredients is made up:

| A silica material containing about 80 percent of $SiO_2$ | 85.2 kg |
| --- | --- |
| blast furnace slag | 2 kg |
| pyrolusite | 2 kg |
| silicon carbide in dust form | 0.3 kg |
| | 89.5 kg |

The mixture is ground to a specific surface of 6–800 $m^2$ per kg according to Blaine.

The ground mixture is mixed intensively with 10.5 kg of sodium hydroxide calculated as 100 percent. The mixture thus obtained is then maintained at 80°–100° C. for 12 hours and is then dried at 200°–300° C. The dry mixture is crushed into smaller particles having sizes mainly between 1 and 5 mm. The particulate mixture is used as an expandable material for the manufacture of glazed wall elements.

A very thin foil (0.035 mm) of plastic material (polyethylene) is placed in the bottom of a refractory mold for the manufacture of wall elements by expanding an expandable material. A layer of an aqueous solution of ethylacrylate glue is applied to the surface of the thin plastic layer. Particles of crushed glass having the desired color tone are sprinkled over the surface of plastic covered by the adhesive. The particles have sizes in the range of 3–6 mm. Above the layer of crushed glass particles thus applied there is then applied another layer of crushed particles having sizes in the range of 1–3 mm. The aqueous solution of adhesive is then permitted to dry thereby to cause the particles of crushed glass to get fixed to each other and to the plastic foil. The particles of expandable material, the preparation of which has been described in the first paragraph above is then applied to the two layers of crushed glass. The height of the refractory mold amounts to 3 cm. The surface dimension of the mold is 60×120 cm.

An apertured lid is then placed on the top of the mold walls thereby to restrict the expansion on heating the mold with contents to expansion temperature and also to secure that the wall element obtains a smooth surface.

The amount of silicon carbide is adjusted to cause the expansion to take place in a manner to produce a wall element having a density amounting to 500 kg/$m^3$.

The firing of the expandable material to cause expansion to take place is carried out in two stages, the first stage being a preheating to 500°–600° C. which is below the temperature at which expansion takes place. The refractory mold with its contents is maintained at this temperature for two hours. Due to the apertures provided in the lid, the oxygen of the atmosphere will get access to the expandable mixture in the mold. In cooperation with the pyrolusite ingredient contained in the mixture, the oxygen will oxidize any carbon present in the mold either supplied by the ingredients of the expandable mixture or obtained as a residue in the combustion of the plastic material and also to oxidize any ferrous oxide (FeO) into ferric oxide ($Fe_2O_3$) thereby to prevent the formation of low melting phases which can disturb the pore formation. In the second stage of the heating, the mold with contents is heated to expansion temperature (860° C.). In this connection, the sodium hydroxide serves as a fluxing agent for the silica material thereby to lower the melting point of the latter to a level to permit expansion at the above temperature. In the strongly alkaline melt obtained as a result of the fluxing, the silicon carbide reacts with the pyrolusite to cause formation of carbon oxides and expansion of the molten material to take place. Simultaneously with the expansion process, the glass particles will sinter together to a homogeneous pore-free glass layer. If the burning should not take place under strongly oxidizing conditions, uncontrollable pore-formation would be the result due to the presence of ferrous oxide (FeO) which is capable of lowering the melting temperature of the expandable mixture. Carbon present in the unexpandable mixture or formed as a residue after firing organic material contained in the mold would deposit as a monomolecular layer between the glass particles to prevent the latter from being sintered together.

An important feature of the invention is that the foam ceramic formed after expansion of the expandable mixture presents mainly the same coefficient of thermal expansion as the glass material of the glassy surface layer. In the present example the glass presents a coefficient of thermal expansion of $9.9 \cdot 10^{-6}$ mm per mm and degree Celcius at 400° C. and $10.6 \cdot 10^{-6}$ mm per mm and degree Celcius at 20°–500° C. The expanded material formed by expansion presents a coefficient of expansion amounting to, respectively, $9.5 \cdot 10^{-6}$ and $10.9 \cdot 10^{-6}$.

After heating, the mold with contents is permitted to cool. The wall element obtained is examined, finding no lustreless or dull spots in the glaze layer formed by sintering the particles of crushed glass.

EXAMPLE 2

The expandable mixture and glaze material in Example 1 are used for the manufacture of floor tiles instead of wall elements.

For that purpose, refractory molds are used having the dimension 45×45×2 cm.

The addition of silicon carbide is adjusted to produce a porous material having the density 750 kg/$m^3$.

A mixture of the following ingredients is made up and ground to the same specific surface area as set forth in Example 1.

| | |
|---|---|
| A silica material containing about 80 percent of SiO$_2$ | 86.85 kg |
| blast furnace slag | 2 kg |
| pyrolusite | 2 kg |
| silicon carbide in dust form | 0.15 kg |
| sodium hydroxide | 9 kg |
| | 100.0 kg |

The mixture is dried and crushed to particles having sizes about 1 mm or slightly below that value.

The manufacture of the tiles takes place as given in Example 1.

The final products present excellent properties and no lustreless or dull spots can be found on their glaze surface.

When wall elements presenting special color tones are desired expensive colored glass materials are mostly required. This especially applies to opaque glass materials in bright color tones. In order to reduce the costs it is possible to do as follows. In the bottom of the mold, there is first applied a layer of uncolored glass particles, for example, crushed window glass. There is then placed a felt or cloth of glass above the layer of crushed glass. The latter has been impregnated with an aqueous solution of a salt capable of yielding the compound presenting the desired color tone or an aqueous suspension of a metal oxide having the desired color tone. It is also possible to apply a thin layer of metallic salt or metal oxide on the particles of the disintegrated glass. It is recommended to wash the particles of crushed glass to remove any dust present thereon if the requirements for quality of the glaze layer are put very high.

What is claimed is:

1. In the known method of producing foamed ceramic bodies by:
   (a) introducing into an open refractory mold a SiO$_2$-containing composition that is known to have the ability of foaming and expanding in volume when heated to 800°–1000° C.,
   (b) heating said refractory mold and composition under strongly oxidizing conditions to a temperature within the range of 800°–1000° C. for a time sufficient to cause the SiO$_2$-containing composition to foam and expand in volume,
   (c) cooling the foamed ceramic body, and
   (d) removing the foamed ceramic body from the refractory mold, the improvement which comprises, prior to step (a), depositing on the bottom of the refractory mold a layer consisting of particles of crushed glass material, said crushed glass material having a melting point of 800°–1200° C. and said layer of crushed glass material being incapable of foaming on heating at a temperature of 800°–1200° C., said mold containing a member selected from the group consisting of carbon and carbon-containing materials, said latter materials being capable of forming carbon upon heating to said temperatures, whereby, in proceeding according to steps (a) and (b) the lower layer in the mold, consisting of crushed glass, will sinter together to form a dense lower surface layer and this dense lower surface layer will also be united by sintering to the overlying layer of the foamed SiO$_2$-containing composition, said oxidizing conditions being sufficient to oxidize said carbon and said organic compounds thereby to prevent formation of non-glossy spots on the glaze surface.

2. A method according to claim 1 wherein the layer of crushed glass material is 3–5 mm thick.

3. A method according to claim 1 wherein said particles of crushed glass material is composed of both large particles and small particles.

4. A method according to claim 3 wherein said large particles are coloured glass material.

5. A method according to claim 4 wherein said coloured glass is arranged to form a pattern.

6. A method according to claim 1 wherein said particles of crushed glass material are bonded together prior to their introduction into the refractory mold.

7. A method according to claim 1 wherein the particles of crushed glass material are deposited on a thin substrate and bonded together by means of an organic binding agent before being introduced into said refractory mold.

8. A method according to claim 7, wherein said thin substrate comprises a material which will be destroyed when heating the mold together with its contents to temperatures between 800°–1000° C., there being formed a packet from the substrate and the mutually bonded granules externally of the mold and said packet being introduced into said mold.

9. A method according to claim 7, wherein the binding agent comprises an acrylate glue.

10. A method according to claim 8, wherein said substrate is polyethylene foil.

11. A method according to claim 1, wherein the oxidizing conditions are provided by the presence of an oxidizing agent in the SiO$_2$-containing composition in combination with oxygen from the atmosphere.

12. A method according to claim 11, wherein the oxidizing agent is a member selected from the group consisting of nitrates, chromates, oxides and permanganates.

13. A method according to claim 12, wherein the oxidizing agent is pyrolusite.

* * * * *